US008869459B2

(12) United States Patent
Wei

(10) Patent No.: US 8,869,459 B2
(45) Date of Patent: Oct. 28, 2014

(54) SHOWER DOOR ASSEMBLY INCLUDING A MECHANISM FOR CONVENIENT ASSEMBLY

(71) Applicant: Foshan Ideal Co., Ltd., Guangdong (CN)

(72) Inventor: Wuxiang Wei, Guangdong (CN)

(73) Assignee: Foshan Ideal Co., Ltd., Foshan, Guangdon (CN)

( * ) Notice: Subject to any disclaimer, the term of this patent is extended or adjusted under 35 U.S.C. 154(b) by 0 days.

(21) Appl. No.: 13/861,055

(22) Filed: Apr. 11, 2013

(65) Prior Publication Data
US 2014/0237903 A1    Aug. 28, 2014

(30) Foreign Application Priority Data

Feb. 27, 2013  (CN) ...................... 2013 2 0089311 U

(51) Int. Cl.
*E06B 3/46* (2006.01)
*E05D 15/12* (2006.01)

(52) U.S. Cl.
CPC ..................................... *E05D 15/12* (2013.01)
USPC .......... 49/505; 49/504; 49/501; 49/53; 49/51; 49/404; 4/612; 4/614

(58) Field of Classification Search
CPC ........... E06B 1/20; E06B 1/60; E06B 1/6015; E06B 1/603
USPC ..................................................... 4/612, 614
See application file for complete search history.

(56) References Cited

U.S. PATENT DOCUMENTS

| 2,217,131 | A | * | 10/1940 | Nilsson | 292/140 |
| 2,739,674 | A | * | 3/1956 | Casebolt | 49/505 |
| 3,553,891 | A | * | 1/1971 | Casebolt et al. | 49/505 |
| 4,831,777 | A | * | 5/1989 | Johnson, Jr. | 49/55 |
| 5,782,039 | A | * | 7/1998 | Scherer et al. | 49/465 |
| 5,992,100 | A | * | 11/1999 | Sidney | 49/505 |
| 6,023,889 | A | * | 2/2000 | Husting et al. | 52/35 |
| 6,079,169 | A | * | 6/2000 | Ashworth | 52/217 |
| 6,347,483 | B1 | * | 2/2002 | Andersen | 49/57 |
| 7,987,637 | B2 | * | 8/2011 | Smith | 52/126.1 |

* cited by examiner

*Primary Examiner* — Katherine Mitchell
*Assistant Examiner* — Marcus Menezes
(74) *Attorney, Agent, or Firm* — Nixon Peabody LLP; Jeffrey L. Costellia

(57) ABSTRACT

A shower door assembly is provided which comprises a stationary frame, and a movable frame having a guiding groove, wherein the shower door assembly further comprises a fixing block disposed in the stationary frame, the fixing block has a channel and a cam mechanism rotatable about a portion of the fixing block, a first engaging element is provided on at least a part of a bottom surface of the channel, and the shower door assembly further comprises an adjusting block disposed in the guiding groove of the movable frame, the adjusting block has an extension part insertable into the channel of the fixing block, the extension part has a second engaging element, wherein when a force is applied to the extension part by the cam mechanism, the first and second engaging elements are engaged such that the stationary and movable frames do not displace.

9 Claims, 8 Drawing Sheets

SHOWER DOOR ASSEMBLY INCLUDING A MECHANISM FOR CONVENIENT ASSEMBLY

CROSS-REFERENCE TO RELATED DOCUMENT

This application claims priority benefit from Chinese utility model application No. 201320089311.0 filed on Feb. 27, 2013 in the name of Foshan Ideal Co. Ltd., the disclosure of which is incorporated herein by reference in its integrity.

FIELD OF THE INVENTION

The present invention relates to a shower door assembly and, in particular, to a structure of a stationary frame and a movable frame for mounting and adjusting a shower door.

BACKGROUND OF THE INVENTION

Conventional shower doors comprise a stationary frame for fixing to a wall and a movable frame that is capable of adjusting its position in relative to the stationary frame such that both frames are properly engagement with each other. In order to engage both frames, the frames have to be aligned and drilled and fasteners are used to pass through the drilled holes and fasten the frames together. The assembly method of this kind is inconvenient to operation and quite time consuming. In addition, the drilling operation can possibly make damage to the materials made of the frames, for example aluminum materials. This may affect the appearance and service life of the shower door, or even cause the shower door unusable.

SUMMARY OF THE INVENTION

An object of the invention is to provide a shower door assembly which has relatively simple structure and is convenient for assembly, and in particular does not need to be drilled.

Another object of the present invention is to provide a fast assembly method for a shower door which has simplified steps and takes less time.

To achieve the above objects, a shower door assembly is provided which comprises a stationary frame, and a movable frame having a guiding groove. The shower door assembly further comprises a fixing block disposed in the stationary frame. The fixing block has a channel and a cam mechanism rotatable about a portion of the fixing block. A first engaging element is provided on at least a part of a bottom surface of the channel.

The shower door assembly further comprises an adjusting block disposed in the guiding groove of the movable frame. The adjusting block has an extension part insertable into the channel of the fixing block, and the extension part has a second engaging element. When a force is applied to the extension part by the cam mechanism, the first and second engaging elements are engaged such that the stationary and movable frames do not displace.

In one embodiment, the shower door assembly further comprises an elastic element located in the guiding groove and filled in a space formed by the adjusting block and the guiding groove. Preferably, the elastic element is a flexible rubber cushion. In this case, the adjusting block may be a rigid member. When a force is applied to the extension part by the cam mechanism, the elastic memble is then pressed by the cam mechanism such that the second engaging element of the extension part is close to and engaged with the first engaging element.

In another embodiment, the extension part has elasticity, such that when the force is applied to the extension part by the cam mechanism, the adjusting block is deformed only at the extension part.

In another embodiment, the fixing block has two parallel wings, and at least a part of the cam mechanism is arranged between the wings.

In another embodiment, the cam mechanism comprises an operating rod and a movement transferring part. The movement transferring part has a bulge located at its bottom, thus when the operating rod is parallel with the extension part, the bulge acts on the extension part to engage the first and second engaging elements.

In another embodiment, the stationary frame has a first through hole and the fixing block has a mounting hole. The fixing block is connected to the stationary frame by a fastener through the first through hole and the mounting hole.

In another embodiment, the stationary frame has a second through hole and is attached to a wall surface by a fastener through the second through hole.

In another embodiment, both the first and second engaging elements are teeth. Preferably, the teeth are in vertical direction.

The present invention has relatively simple structure and is convenient for assembly. In particular, it does not need to be drilled such that the risk of damage is minimized. In addition, a fast assembling method can thus be obtained that has simplified steps and takes less time.

BRIEF DESCRIPTION OF THE DRAWINGS

Further advantages and details of the present invention emerge from the example embodiments described below, which do not limit the invention in any way, and from the drawings, in which FIG. 1 schematically shows a shower door assembly in the exploded state according to one example of the present invention.

Elements that are irrelevant to the spirit of the present invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

Figure 1:
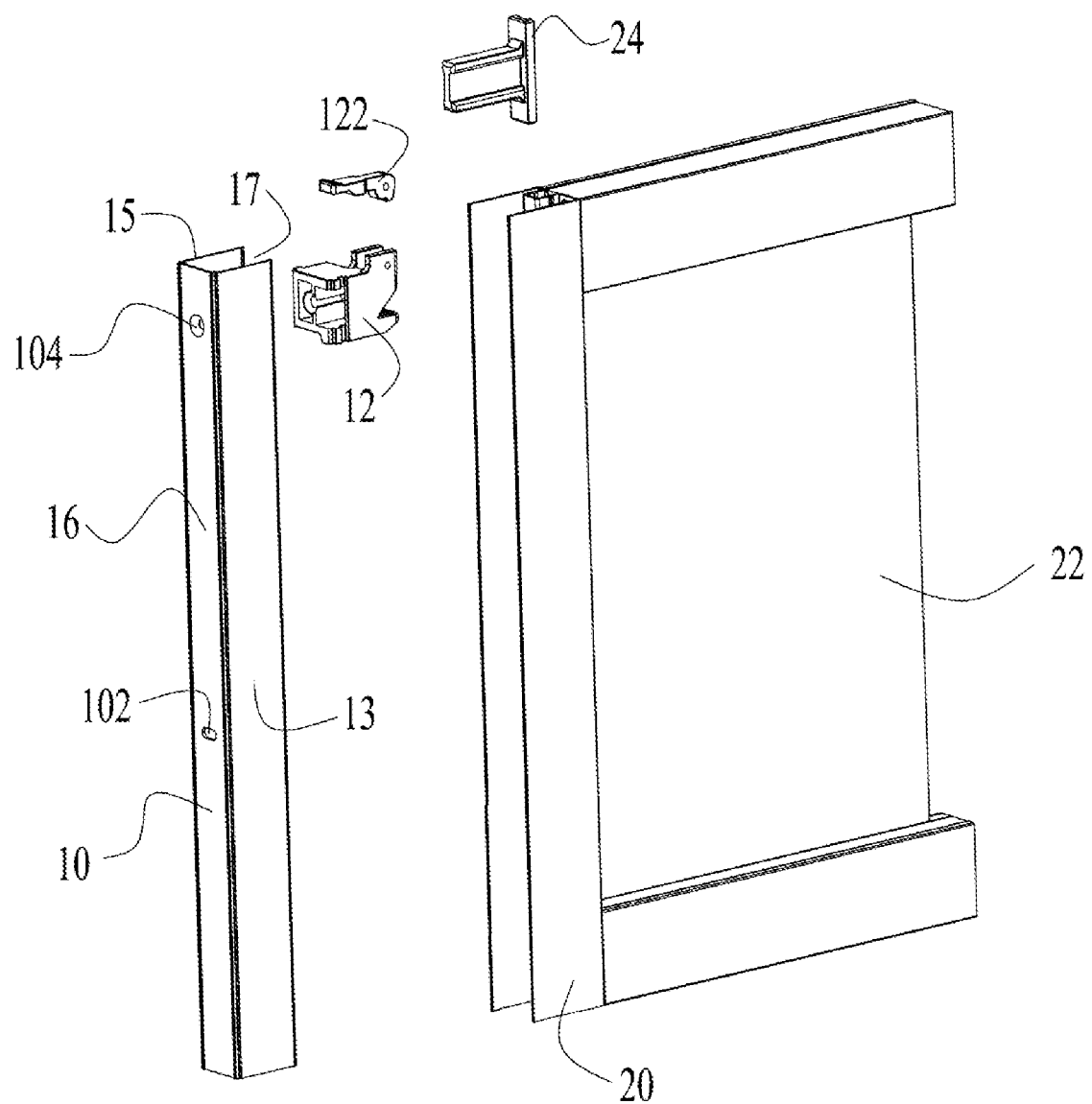

Referring to FIG. 1, a shower door assembly in an exploded state according to one example of the present invention is shown. In this example, the shower door assembly comprises a stationary frame 10 and a movable frame 20. The movable frame is equipped with a door 22 (for example, a glass door 22) in a known suitable manner.

The stationary frame 10 comprises a base wall 16 and two sidewalls 13 and 15, together to define a groove 17. The stationary frame 10 may be attached to a wall surface by suitable means, such as fasteners or adhesives. In this example, the stationary frame 10 has a through hole 102 on the base wall 16 and is fixed to a wall surface by using a fastener (not shown), such as a screw, through the through hole 102.

The shower door assembly further comprises a fixing block 12 and an adjusting block 24. The fixing block 12 can be accommodated in the groove 17 of the stationary frame 10 and be tightly connected with the stationary frame 10. In this example, the stationary frame 10 has another through hole 104 on the base wall 16, and the fixing block 12 has a screw hole 121 (see FIG. 2). The fixing block 12 is connected to the stationary frame 10 by a fastener through the through hole 104 and the screw hole 121.

Figure 2:
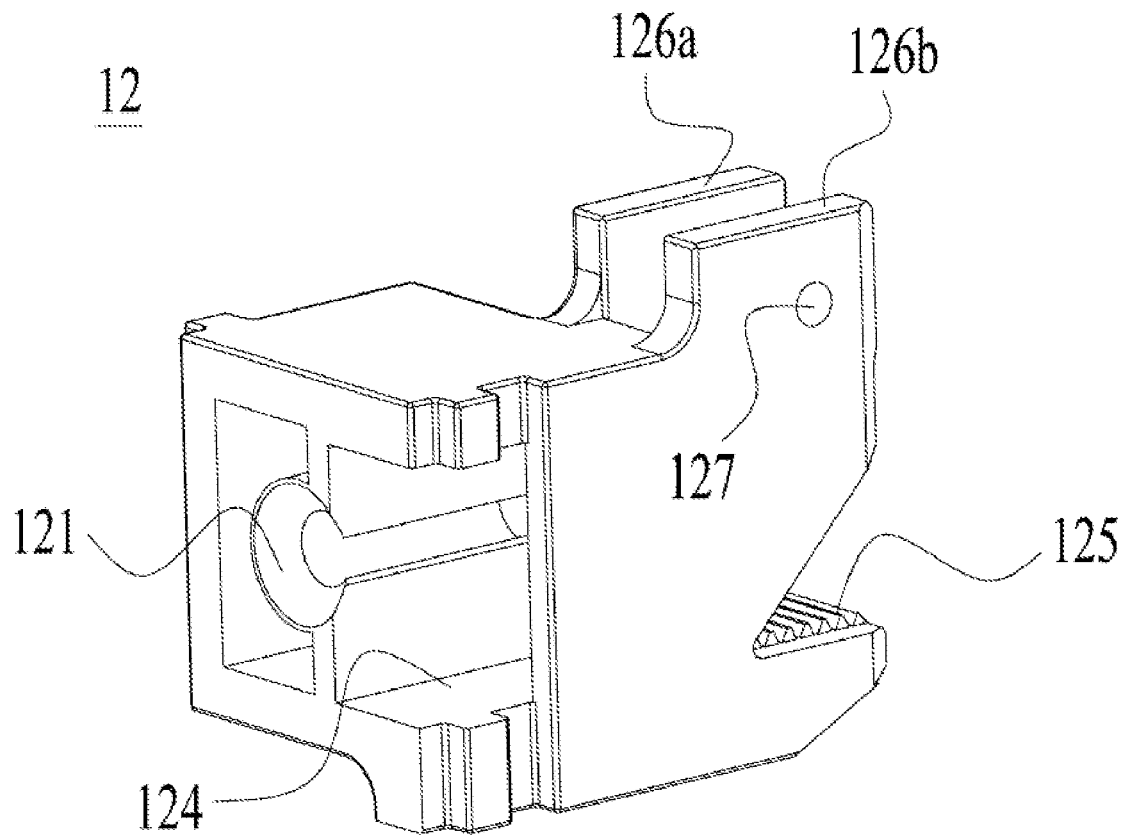
FIG. 2 shows a fixing block according to one example of the present invention.
Figure 3:
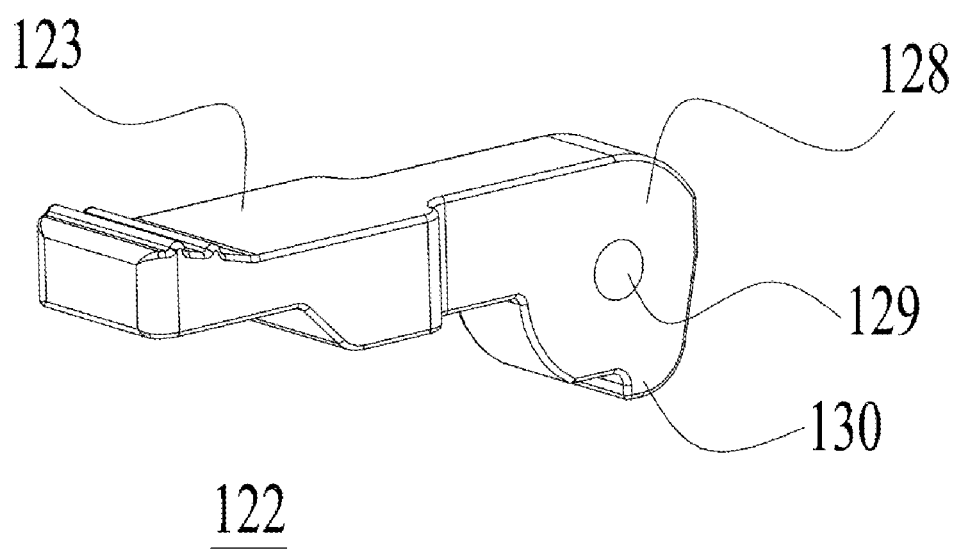
FIG. 3 shows a cam mechanism according to one example of the present invention.

Referring to FIGS. 2 and 3, a fixing block 12 according to one example of the present invention is shown. The fixing block 12 comprises a channel 124 penetrating through the fixing block 12. At least a part of a bottom surface of the channel 124 is formed with teeth 125. The fixing block 12 further comprises a cam mechanism 122. Two parallel wings 126a, 126b (collectively called wings 126) are extended upwardly from the upper surface of the fixing block 12. The cam mechanism 122 is arranged in the space formed between the wings 126.

Each wing 126 has a through hole 127 and the cam mechanism 122 also has a through hole 129 such that the cam mechanism 122 is connected to the fixing block 12 by a pin (not shown) through the through hole 127 and the through hole 129, and the cam mechanism 122 is rotatable about the pin within the range of at least 90°.

In this example, the cam mechanism 122 comprises an operating rod 123 and a movement transferring part 128. The operating rod 123 is used for manual operation to rotate the cam mechanism 122, and the movement transferring part 128 comprises a downwardly extending bulge 130 located at its bottom. The movement of the cam mechanism 122 is transferred to other parts by the bulge 130, which will be described in detail hereinafter).

Figure 4:
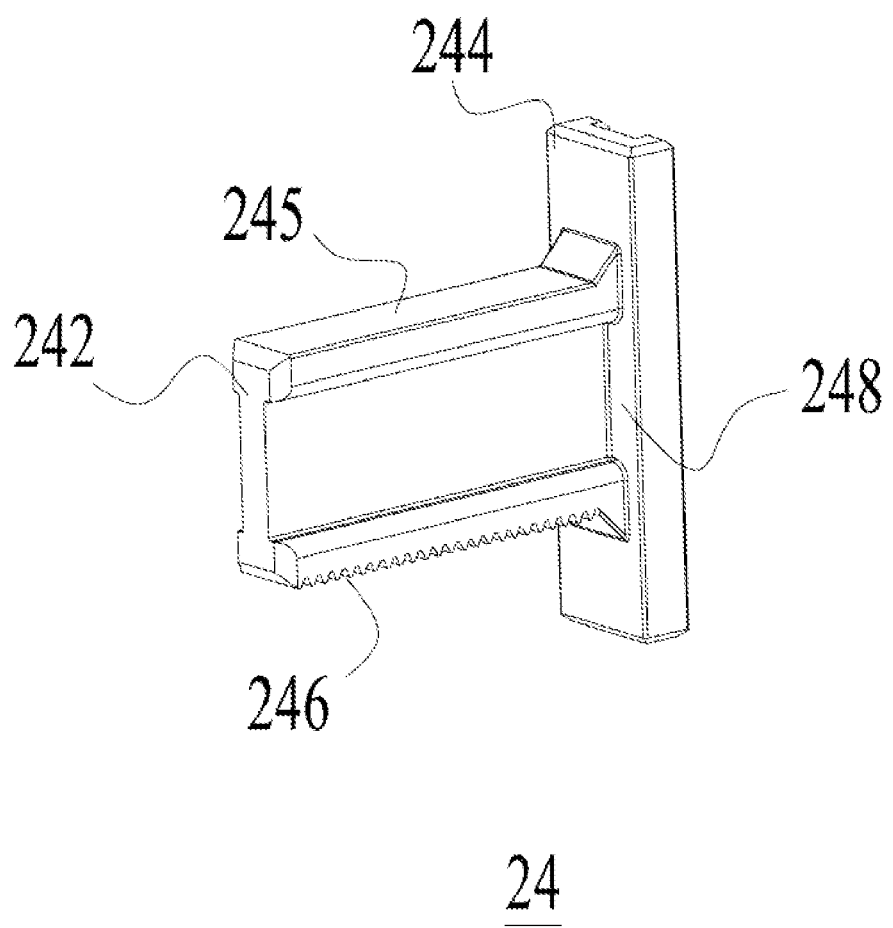
FIG. 4 shows an adjusting block according to one example of the present invention.

Referring to FIG. 4, an exemplary adjusting block 24 according to the present invention is shown. The adjusting block 24 comprises a base 244 and an extension part 242 perpendicular to the base 244. The extension part 242 is used to insert into the channel 124 of the fixing block. In this example, the extension part 242 is substantially rectangular, and provided with teeth 246 on its lower surface. Of course, the extension part 242 may have other shapes substantially complementary to the channel 124 such that it can be freely inserted into the channel 124 when unlocked.

Figure 5:
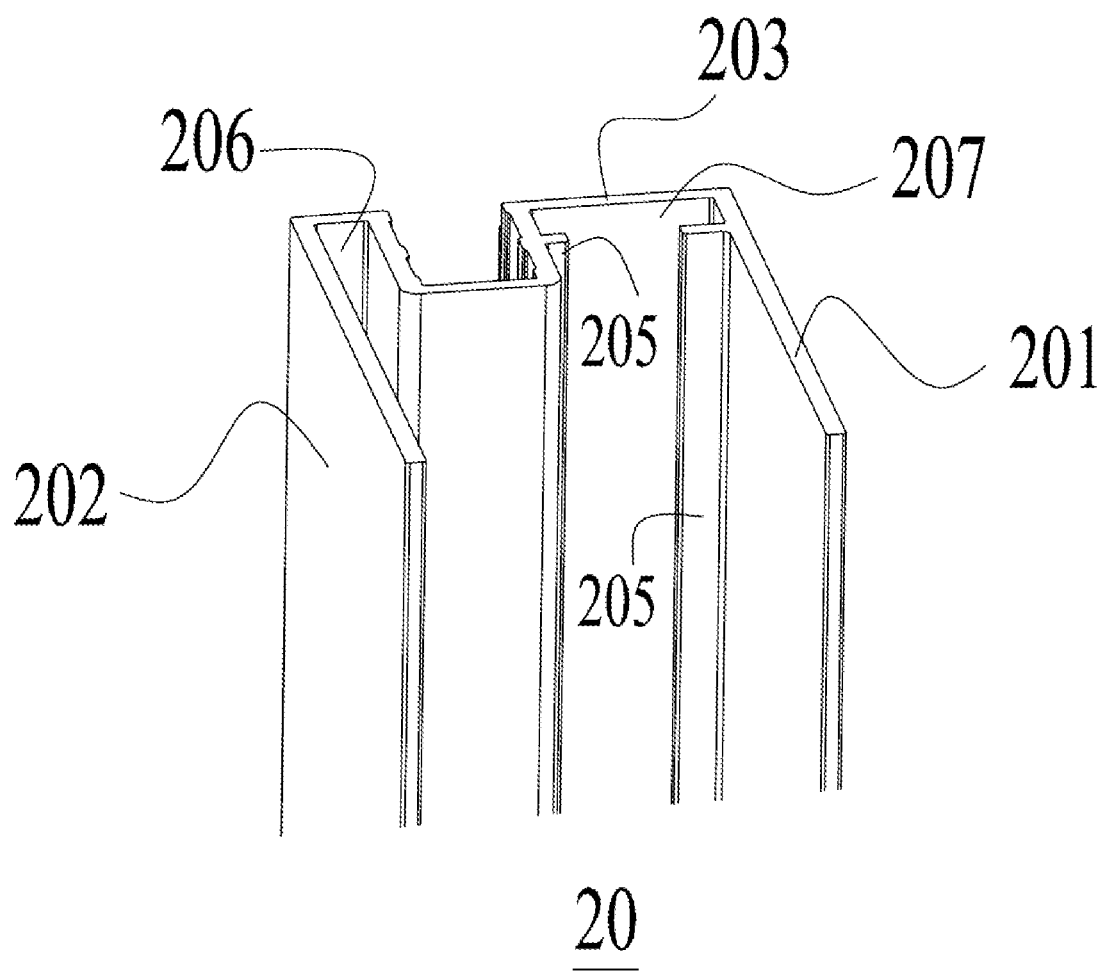
FIG. 5 shows a movable frame in part according to one example of the present invention.

Referring to FIG. 5, an exemplary movable frame 20 according to the present invention is shown in part. In this example, the movable frame 20 comprises a base wall 203 and two side walls 201 and 202. The movable frame 20 has a slot 206 for accommodating one side wall (13 or 15) of the stationary frame. Two opposed baffles 205 are arranged on the side wall 201 and the base 203 to form a guiding groove 207. The base 244 of the adjusting block 24 can be inserted into the guiding groove 207, with the guiding part 248 (see FIG. 4) of the base 244 abutting against the baffles 205. In this example, the adjusting block is connected to an appropriate position of the movable frame by appropriate means, so that its extension part is insertable into the channel 124.

Figure 6:
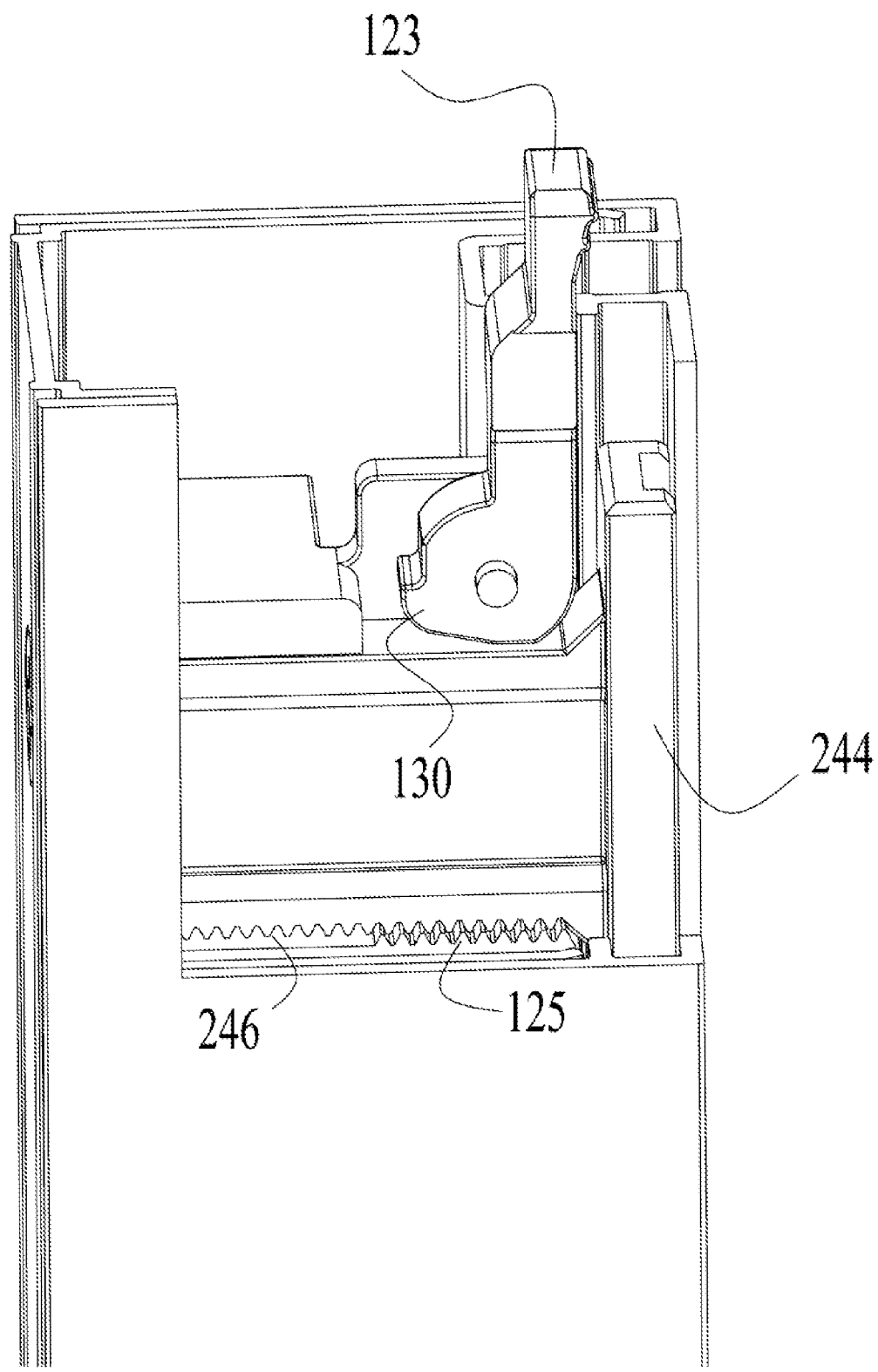
FIG. 6 shows a cam mechanism in the unlocked state according to one example of the present invention.
Figure 7:
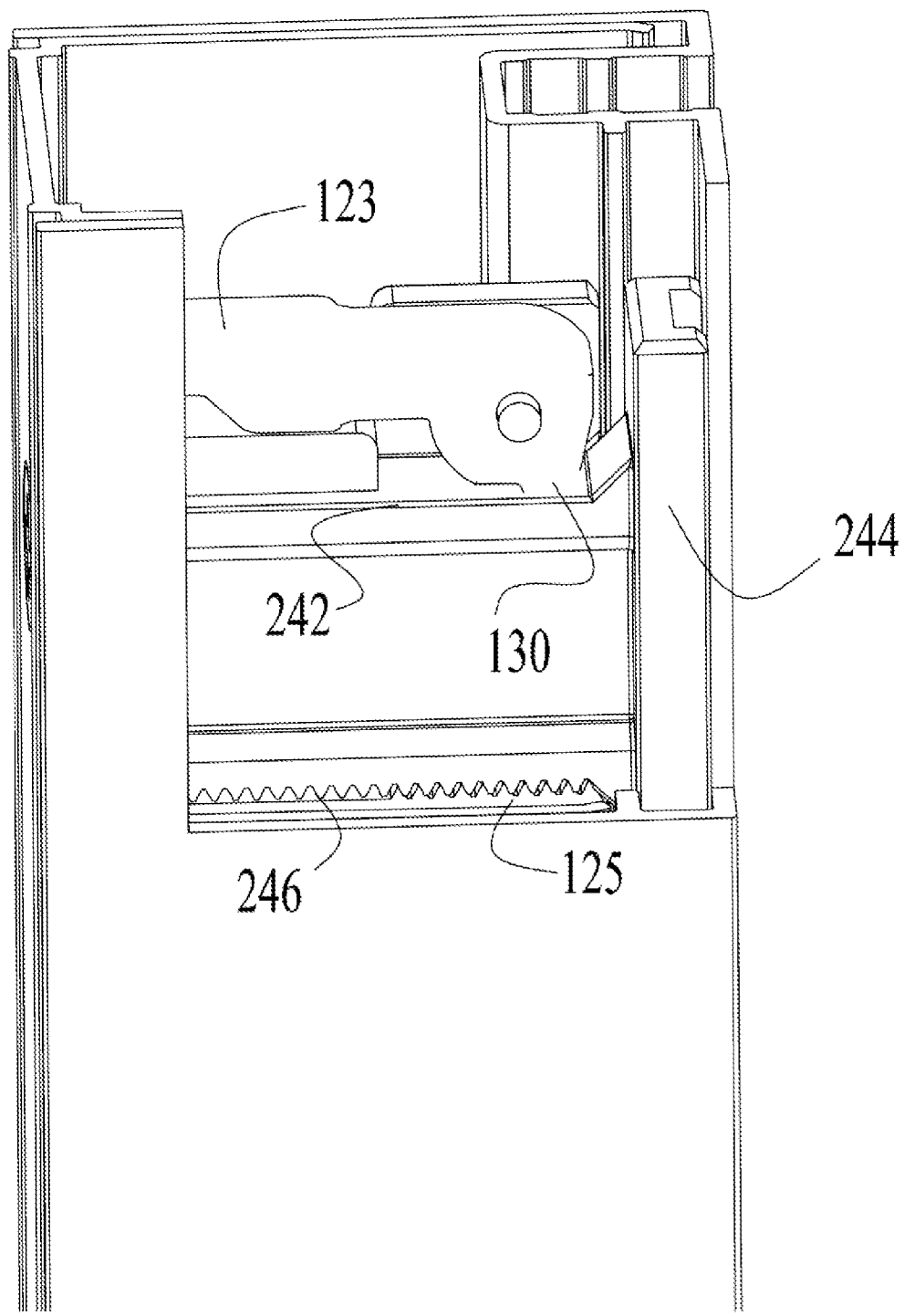
FIG. 7 shows a cam mechanism in the locked state according to one example of the present invention.

FIGS. 6 and 7 show different states of engagement between the stationary frame 10 and movable frame 20, when the cam mechanism 122 is in different positions, according to one example of the present invention. FIG. 6 shows a state diagram when the operating rod of the cam mechanism 122 is in the vertical position, wherein the stationary frame 10 and the movable frame 20 are not tightly connected at the moment. As can be seen from the figure, the bulge 130 is in the horizontal position and does not act on the adjusting block 24, consequently the teeth 246 of the adjusting block 24 is not engaged with the teeth 125 of the fixing block 12. As shown FIG. 7, when the cam mechanism 122 is rotated approximately 90° in counterclock direction, the bulge 130 is rotated counterclockwise the same angle at the same time so as to press the extension part 242 of the adjusting block 24 (specifically, the upper surface 245 of the extension part 242, as shown in FIG. 4), so that the teeth 246 of the lower surface of the extension part 242 is gradually approaching to and finally engaged with the teeth 125, thus the stationary frame 10 and the movable frame 20 are tightly connected.

In this example, the extension part 242 of the adjusting block 24 preferably has elasticity, such that when pressed by the bulge 130, the extension part 242 will bent downwardly to engage the teeth 246 and the teeth 125. The base 244 of the adjusting block 24 may be rigid or elastic. Preferably, the base 244 is also elastic such that when the bulge 130 acts on the extension part 246, it can reduce the force to the movable frame 20, especially to the baffles 205.

Figure 8:
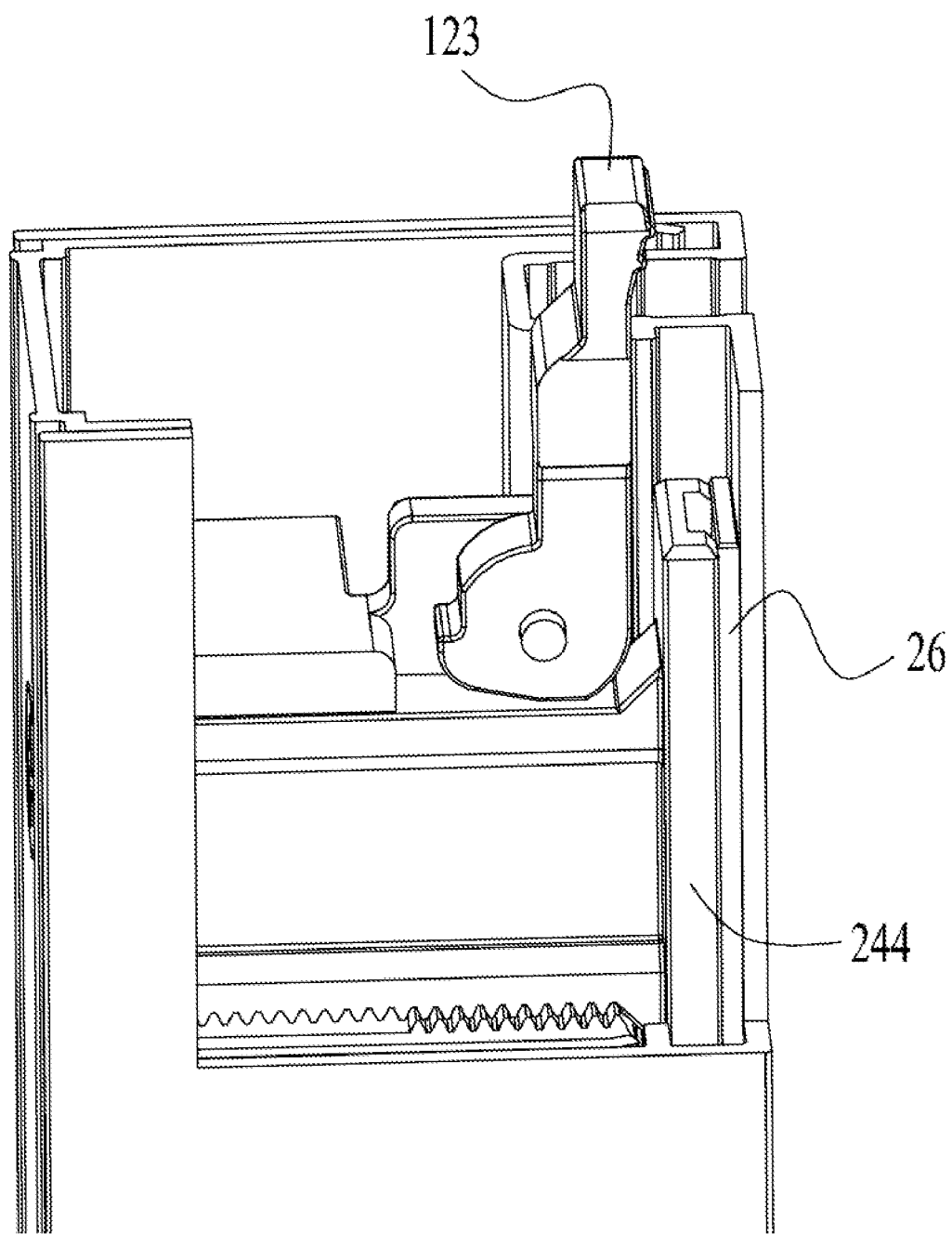
FIG. 8 shows a cam mechanism in the unlocked state according to another example of the present invention.
Figure 9:
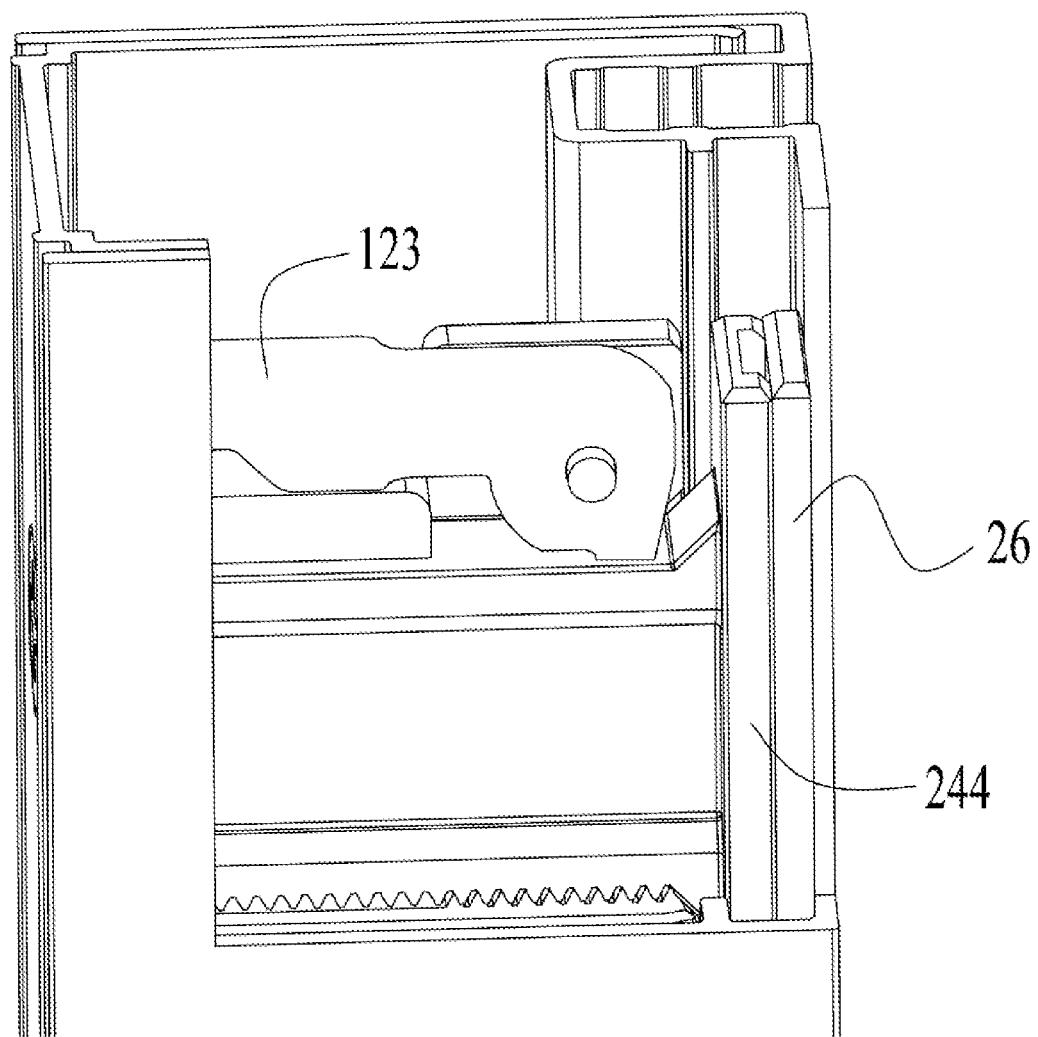
FIG. 9 shows a cam mechanism in the locked state according to another example of the present invention.

As shown in FIGS. 8 and 9, in another example, an elastic element (such as a flexible rubber cushion 26) is disposed in the guiding groove 207 of the movable frame 20, between the adjusting block 24 and the base 203, and filled in a space formed by the base 244 and the base 203. In this case, the whole adjusting block 24 may be rigid. When the extension part 242 is pressed by the bulge 130, the flexible rubber cushion 26 is then pressed by the base 244 to engage the teeth 246 and the teeth 125. When a relative position between the stationary frame 10 and the movable frame 20 needs to be adjusted, the cam mechanism 122 is rotated such that the bulge 130 does not act on the extension part 246, and the resilience of the flexible rubber cushion 26 enables the teeth 246 to leave the teeth 125, allowing the stationary frame 10 and the movable frame 20 to be separated.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:
1. A shower door assembly, comprising
a stationary frame,
a movable frame having a guiding groove, a fixing block disposed in the stationary frame, the fixing block having a channel and a cam mechanism rotatable about a portion of the fixing block, a first engaging element being provided on at least a part of a bottom surface of the channel, and an adjusting block disposed in the guiding groove of the movable frame, the adjusting block having an extension part insertable into the channel of the fixing block, the extension part having a second engaging element, wherein the cam mechanism comprises an operating rod and a movement transferring part, the movement transferring part having a bulge located at a bottom of the movement transferring part, and wherein when a force is applied to the extension part by the bulge of the cam mechanism to make the operating rod be parallel with the extension part, the first and second engaging elements are engaged such that the stationary and movable frames do not displace.

2. The shower door assembly of claim 1, wherein the shower door assembly further comprises an elastic element located in the guiding groove and sandwiched between the adjusting block and the guiding groove.

3. The shower door assembly of claim 2, wherein the elastic element is a rubber cushion.

4. The shower door assembly of claim 1, wherein the extension part has elasticity, such that when the force is applied to the extension part by the cam mechanism, the adjusting block is deformed only at the extension part.

5. The shower door assembly of claim 1, wherein the fixing block has two parallel ridges, and at least a part of the cam mechanism is arranged between the ridges.

6. The shower door assembly of claim 1, wherein the stationary frame has a first through hole and the fixing block has a mounting hole, the fixing block is connected to the stationary frame by a fastener through the first through hole and the mounting hole.

7. The shower door assembly of claim 1, wherein the stationary frame has a second through hole and is attached to a wall surface by a fastener through the second through hole.

8. The shower door assembly of claim 1, wherein both the first and second engaging elements are teeth.

9. The shower door assembly of claim 8, wherein the teeth extend in a vertical direction.

* * * * *